United States Patent
Taura et al.

[11] Patent Number: 6,028,900
[45] Date of Patent: *Feb. 22, 2000

[54] DIGITAL BROADCAST RECEIVER

[75] Inventors: Kenichi Taura; Masahiro Tsujishita; Tadatoshi Ohkubo; Masayuki Ishida; Yoshiharu Ohsuga, all of Tokyo, Japan

[73] Assignee: Mitsubishi Denki Kabushiki Kaisha, Tokyo, Japan

[ * ] Notice: This patent is subject to a terminal disclaimer.

[21] Appl. No.: 08/861,072

[22] Filed: May 21, 1997

[30] Foreign Application Priority Data

May 22, 1996 [JP] Japan ................................. 8-127273

[51] Int. Cl.$^7$ .................................................. H04L 27/06
[52] U.S. Cl. ........................ 375/344; 375/260; 329/304; 455/182.2
[58] Field of Search ..................................... 375/344, 316, 375/340, 349, 362, 371, 355, 260, 329; 370/503, 516, 358; 329/304; 455/182.1, 182.2

[56] References Cited

U.S. PATENT DOCUMENTS

| 5,191,576 | 3/1993 | Pommier et al. . |
| 5,239,400 | 8/1993 | Liu .......................................... 359/125 |
| 5,444,697 | 8/1995 | Leung et al. ............................. 370/516 |
| 5,471,464 | 11/1995 | Ikeda ........................................ 375/364 |
| 5,790,784 | 8/1998 | Beale et al. ........................ 395/200.01 |

FOREIGN PATENT DOCUMENTS

| 3524145A1 | 1/1988 | Germany . |
| 4335228C2 | 3/1996 | Germany . |
| 2278257 | 11/1994 | United Kingdom . |
| 9300747A1 | 1/1993 | WIPO . |

*Primary Examiner*—Chi H. Pham
*Assistant Examiner*—Bryan Webster

[57] ABSTRACT

To control the oscillation frequency of a local oscillator, a digital broadcast receiver demodulates a phase-reference symbol contained in an orthogonal frequency-division multiplexed broadcast signal, modifies the resulting frequency-domain data by multiplication with complex conjugates of known data encoded in the phase-reference signal, under different assumed frequency offsets, converts the modified data to time-domain data, and thereby detects a first frequency error equal to a multiple of the subcarrier spacing and a second frequency error not exceeding the subcarrier spacing. Differential phase error is also detected. The oscillation frequency is adjusted to correct the first frequency error and differential phase error; then the second frequency error is used to correct for ambiguity in the differential phase error.

16 Claims, 9 Drawing Sheets

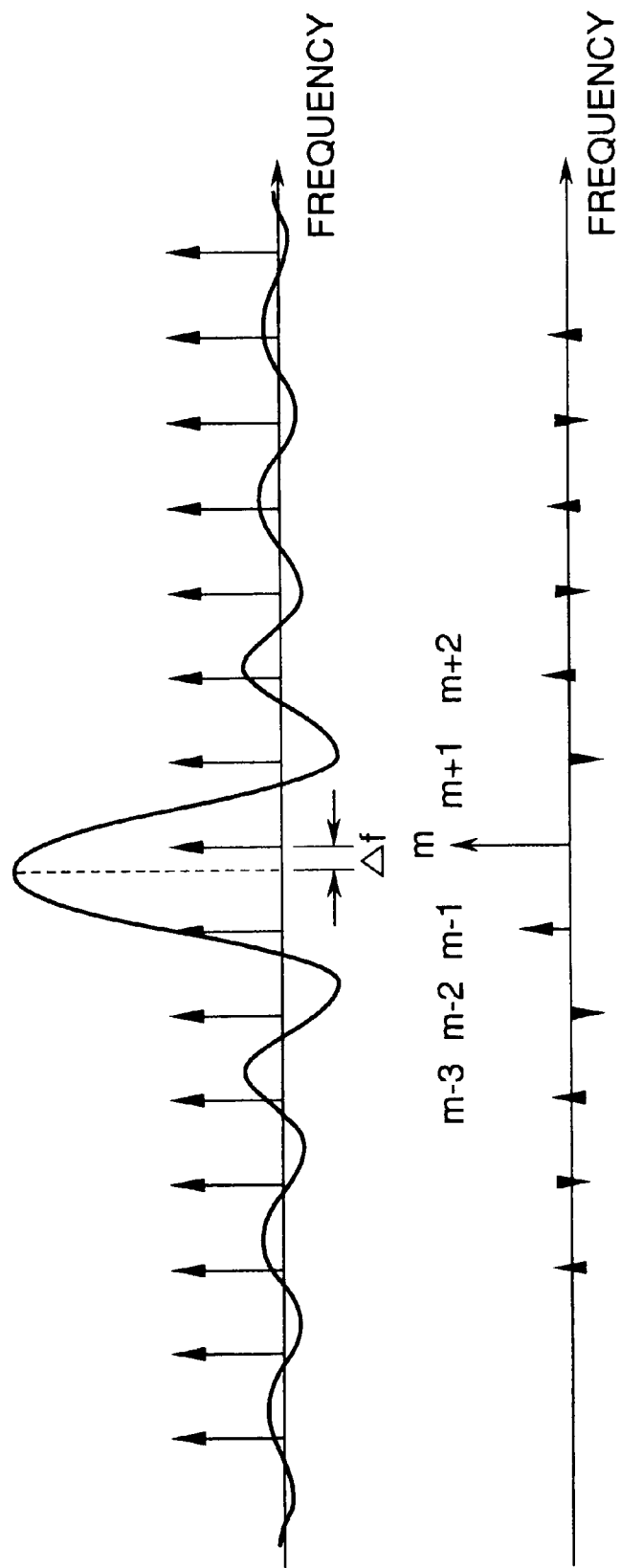

DIGITAL BROADCAST RECEIVER

BACKGROUND OF THE INVENTION

The present invention relates to a digital broadcast receiver for receiving a broadcast signal in which a plurality of subcarrier signals, each modulated by differential phase-shift keying, are multiplexed by orthogonal frequency-division multiplexing.

Systems for broadcasting audio signal data by orthogonal frequency-division multiplexing (referred to below as OFDM) have been standardized in recommendation BS.774 of the Radiotelecommunication Standardization Sector of the International Telecommunication Union (ITU-R). A data frame conforming to this recommendation begins with a zero-amplitude null symbol followed by a phase-reference symbol. In a conventional receiver, the signal received at the antenna is down-converted to an intermediate frequency by mixing with a signal generated by a local oscillator. The intermediate-frequency signal is detected by an orthogonal demodulator to produce a baseband signal, which is converted from analog to digital form, then processed by means of a discrete Fourier transform, thereby detecting subcarrier phase information. A differential demodulator takes the difference between the phase angles of successive symbols to obtain demodulated data, which are decoded to obtain an audio signal. The discrete Fourier transform processing is synchronized by means of an envelope detector that detects the null symbol at the beginning of each data frame. Both frame synchronization and symbol synchronization are controlled in this way.

The differential phase data output by the differential demodulator have nominal values of $\pi/4$, $3\pi/4$, $5\pi/4$, and $7\pi/4$. Phase error is detected by multiplying the differential phase data by four, then dividing by $2\pi$, producing remainders with nominal values of $\pi$. The remainders are averaged over a certain number of symbols, then $\pi$ is subtracted from the average remainder to obtain an error value $\epsilon$, and the frequency of the local oscillator is tuned so as to reduce $\epsilon$ to zero.

This conventional method of tuning is inherently ambiguous, because $\alpha$ is equal to zero not only when the phase error is zero, but also when the phase error is equal to $\pi/2$, $\pi$, or $3\pi/2$. If the phase error is larger than $\pi/4$, the conventional method will usually tune the local oscillator to a frequency that produces a phase error of $\pi/2$, $\pi$, or $3\pi/2$ instead of the desired phase error of zero. In other words, the conventional method cannot detect or correct phase errors equal to non-zero multiples of $\pi/2$.

A further deficiency of the conventional method is that the different subcarrier frequencies in the OFDM signal are not identified. If the local oscillator operates at a frequency that differs from the correct frequency by more than half the subcarrier frequency spacing, the conventional method will again tend to tune the local oscillator toward the incorrect frequency.

A still further problem arises from the use of envelop detection for frame and symbol synchronization. When the signal is contaminated with reflection or other noise, the envelop detector may be unable to detect the null symbol reliably and accurately, creating serious difficulties in synchronization. This problem is particularly troublesome when the receiver is mounted in a moving vehicle, the motion of which necessitates frequent fine adjustments of the synchronization timing.

The above problems are not limited to the reception of digital audio broadcasts conforming to ITU-R recommendation BS.774. Similar problems can occur with other digital broadcast signals of the same general type. These signals will be referred to generically as PSK-OFDM signals, PSK denoting phase-shift keying and OFDM denoting orthogonal frequency-division multiplexing. A PSK-OFDM signal will be assumed to have a frame synchronization symbol such as the above-mentioned null symbol, and a phase reference symbol that establishes a separate phase reference for each subcarrier, thereby enabling differential demodulation of the subsequent data symbol at each subcarrier frequency.

SUMMARY OF THE INVENTION

One object of the present invention is to detect and correct both large and small frequency errors in the tuning of a digital broadcast receiver.

A further object of the invention is to confirm frame synchronization reliably in a digital broadcast receiver.

A still further object is to make accurate timing adjustments in a digital broadcast receiver.

According to the present invention, a digital broadcast receiver employing a local oscillator and a discrete-Fourier-transform processor to receive a PSK-OFDM signal processes the frequency-domain data obtained from the phase-reference symbol and thereby detects two types of frequency errors: a first frequency error equal to an integer multiple of the subcarrier frequency spacing, and a second frequency error not exceeding the subcarrier frequency spacing. The receiver also detects a third type of frequency error on the basis of differential phase error present in the frequency-domain data obtained from the data symbols in each frame, and detects the frame-synchronization symbol.

The receiver begins by detecting the synchronization symbol and synchronizing the discrete-Fourier-transform processor thereto and, then tunes the local oscillator responsive the first and third frequency errors. When the first frequency error has been reduced to zero and the third frequency error has been reduced to a sufficiently small value, the receiver next tunes the local oscillator according to the second frequency error. This process of tuning the local oscillator according to the first frequency error and third frequency error, then according to the second frequency error, is repeated indefinitely, thereby holding the first frequency error to zero, holding the second frequency error to a value small enough to overcome the ambiguity of the differential phase error, and holding the third frequency error to a value small enough to ensure a desired degree of tuning accuracy.

The first and second frequency errors are detected by multiplying the frequency-domain data by known data with various assumed frequency offsets, among which are a zero frequency offset and at least one non-zero frequency offset, and by transforming the results back to the time domain.

The receiver preferably also detects a timing error by processing the frequency-domain data obtained from the phase-reference symbol, and adjusts the synchronization of the discrete-Fourier-transform processor so as to correct this timing error. The timing error is detected from the position of the peak value in the time-domain data obtained with an assumed frequency offset of zero. Loss of frame synchronization is preferably detected from the magnitude of this peak value.

The invented digital broadcast receiver corrects large frequency errors on the basis of the first and second frequency errors, and corrects small frequency errors on the basis of the third frequency error.

Synchronization can be reliably confirmed from the magnitude of the above-mentioned peak value.

Accurate adjustments of the synchronization of the discrete-Fourier-transform processor can be made according to the timing of the peak value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 shows an example of frequency error;

FIG. 6 illustrates frequency-domain data resulting from the frequency error in FIG. 5;

DETAILED DESCRIPTION OF THE INVENTION

Embodiments of the invention will be described with reference to the attached drawings.

Figure 1:
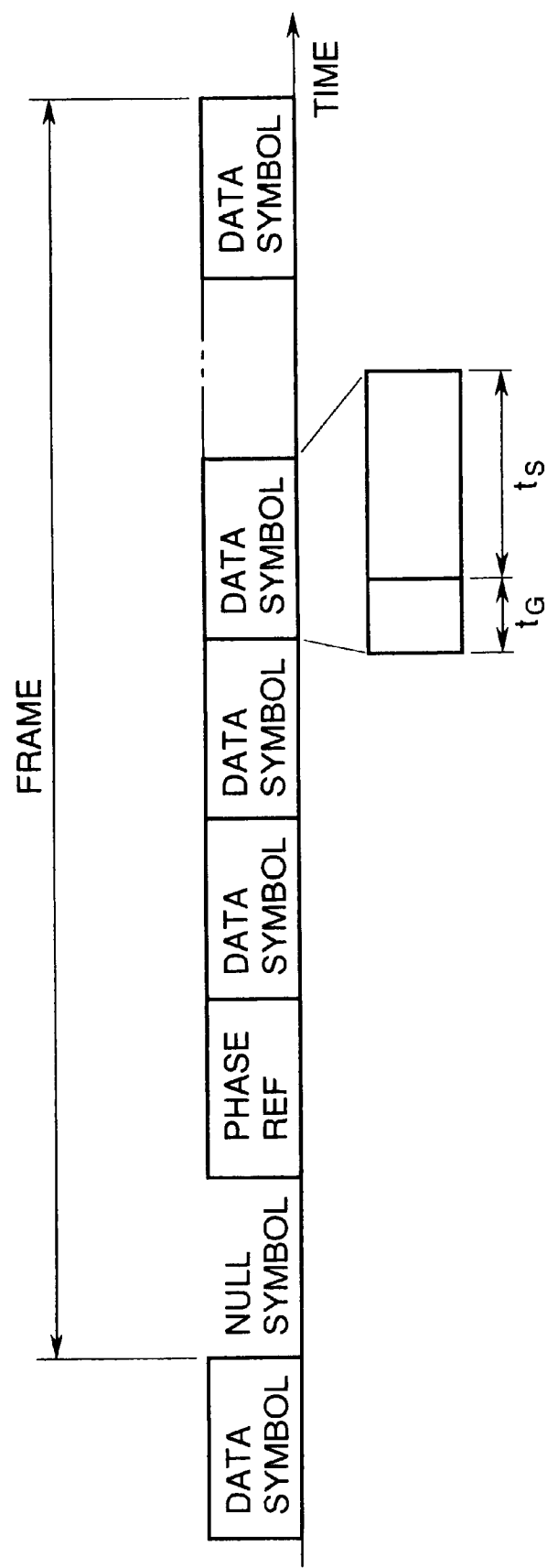
FIG. 1 illustrates a digital broadcast signal frame.

Referring to FIG. 1, the embodiments described below receive a PSK-OFDM audio signal that is divided into frames, each frame comprising two reference symbols followed by a fixed number of data symbols. The first reference symbol is the frame-synchronization symbol, more specifically a null symbol; the second reference symbol is the phase-reference symbol. Each data symbol comprises a guard interval of duration $t_G$ and a valid symbol interval of duration $t_S$.

Frames of the type shown in FIG. 1 are transmitted simultaneously on K subcarrier signals, each modulated by a differential phase-shift keying scheme such as differential quadrature phase-shift keying (DQPSK). The subcarrier signal frequencies are separated from one another by a certain subcarrier frequency spacing $F_s$. K is an integer greater than one, values of K exceeding one thousand being not unusual.

Figure 2:
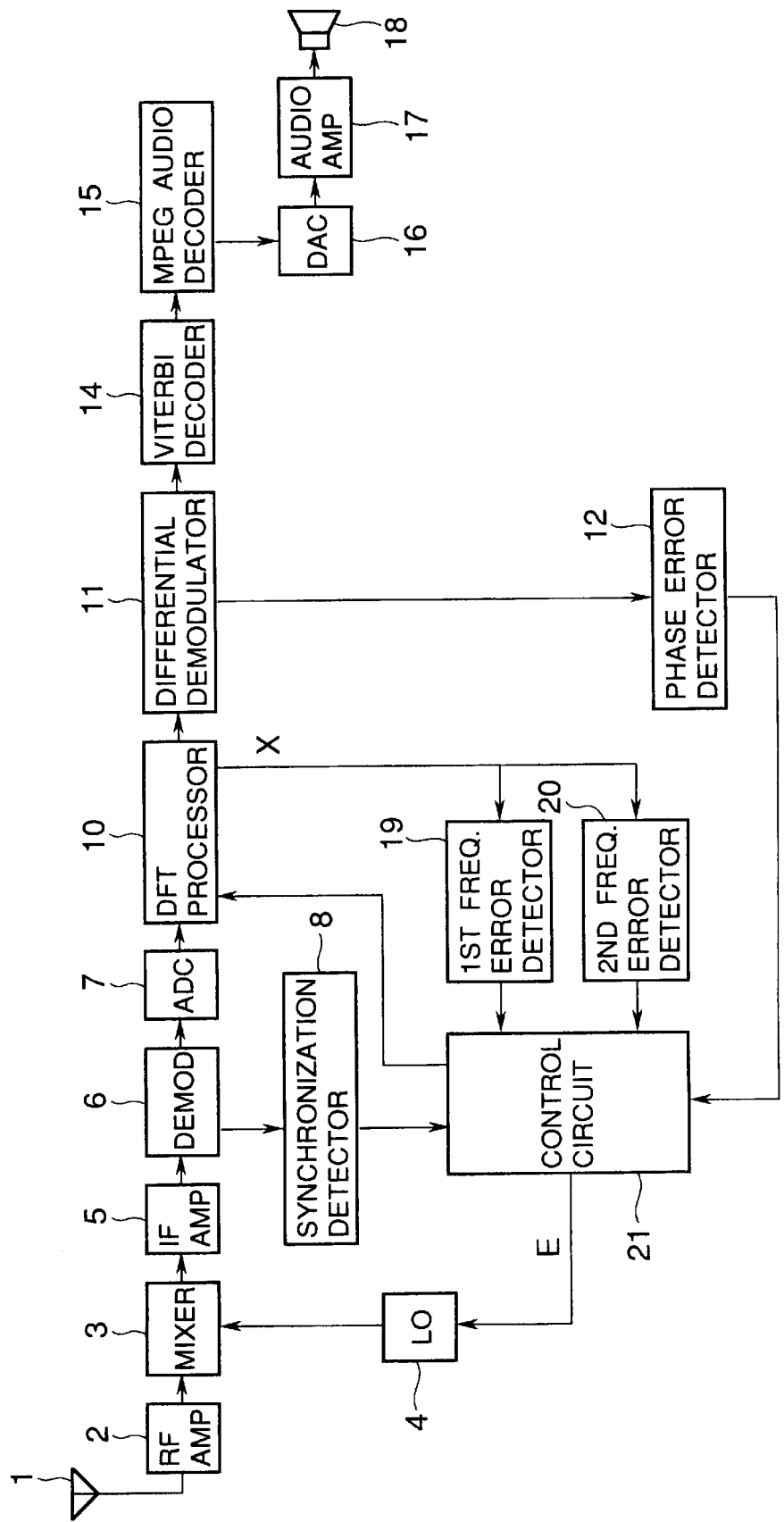
FIG. 2 is a block diagram of a first embodiment of the invention.

Referring to FIG. 2, a first embodiment comprises an antenna 1 for receiving the PSK-OFDM audio signal, a radio-frequency amplifier (RF AMP) 2 for amplifying the received signal, and a mixer 3 for mixing the amplified signal with an unmodulated signal produced by a local oscillator (LO) 4, thereby down-shifting the PSK-OFDM signal to an intermediate frequency. An intermediate-frequency amplifier (IF AMP) 5 amplifies the intermediate-frequency signal and rejects unwanted signal components such as adjacent-channel interference components. The resulting amplified intermediate-frequency signal is demodulated by an orthogonal demodulator (DEMOD) 6, thereby being further down-shifted to a baseband frequency, and the baseband signal is sampled and digitized by an analog-to-digital converter (ADC) 7. The baseband signal is also provided in analog form to a synchronization detector 8, which detects the envelope of the baseband signal.

A discrete-Fourier-transform (DFT) processor 10 performs a discrete Fourier transform on the digitized baseband signal, thereby deriving frequency-domain data. For each symbol, these data comprise an array of K complex values, corresponding to the K subcarrier signals multiplexed in the PSK-OFDM signal. Each complex value has real and imaginary components, also referred to as in-phase and quadrature components. By a well-known mathematical transformation, however, the complex value can be represented by an absolute magnitude and a phase angle.

A differential demodulator 11 subtracts the phase angles in successive symbols to obtain differential phase data. A phase error detector 12 detects differential phase error by processing the differential phase data, thereby detecting small frequency errors of the local oscillator 4, A Viterbi decoder 14 decodes the differential phase data, and an MPEG audio decoder 15 decodes the output of the Viterbi decoder 14 to obtain a digital audio data stream, which is converted to an analog audio signal by a digital-to-analog converter (DAC) 16, amplified by an audio amplifier 17, and reproduced through a loudspeaker 18, The preceding elements are similar to corresponding elements found in conventional digital broadcast receivers. Viterbi decoding is a well-known type of maximum-likelihood decoding, and MPEG audio coding is a coding system recommended by the Motion Picture Experts Group (MPEG) and International Standards Organization (ISO).

In addition to the above elements, the first embodiment has a novel first frequency error detector 19 that processes the frequency-domain data X obtained by the DFT processor 10 from the phase-reference symbol to detect frequency error in multiples of the subcarrier frequency spacing $F_s$. A novel second frequency error detector 20 processes the same frequency-domain data X to detect frequency errors equal to or less than $F_s$. A novel control circuit 21 receives the outputs of the synchronization detector 8, phase error detector 12, first frequency error detector 19, and second frequency error detector 20, and generates an oscillator control signal E that controls the oscillation frequency of the local oscillator 4.

Figure 3:
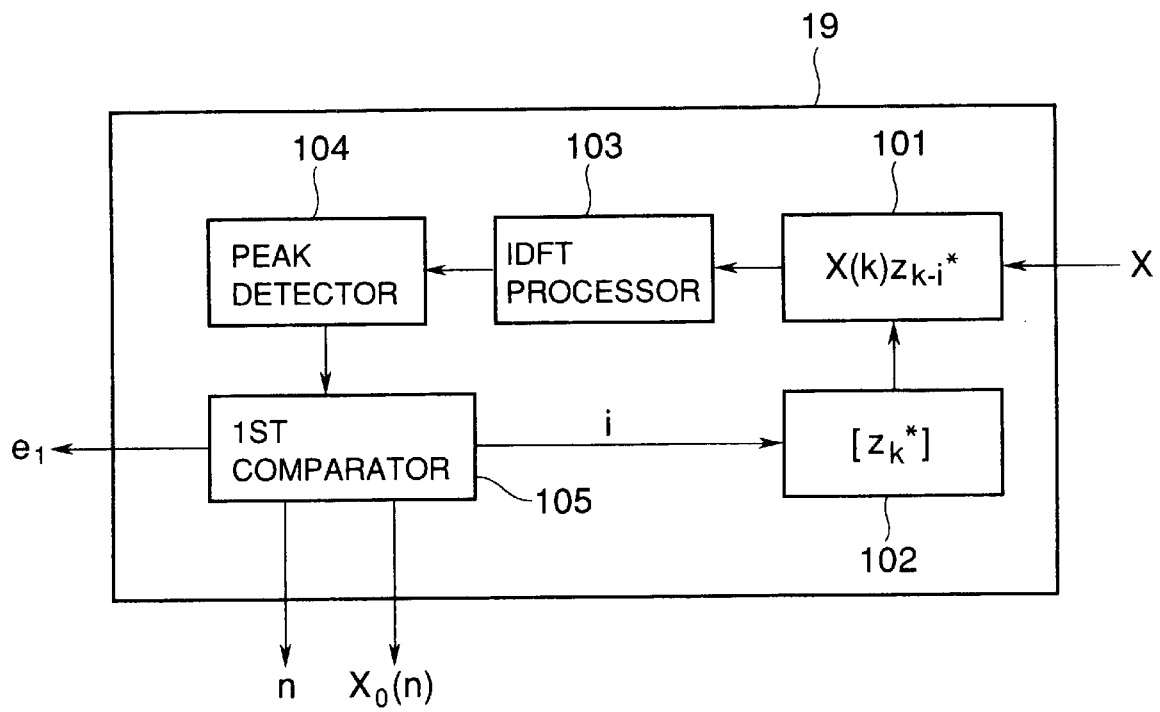
FIG. 3 is a block diagram of the first frequency error detector in the first embodiment.

FIG. 3 shows the internal structure of the first frequency error detector 19. The frequency-domain data X are received by a phase modifier 101, which also receives an array of known values from an array memory 102. An inverse-discrete-Fourier-transform (IDFT) processor 103 performs an inverse discrete Fourier transform on the products of these data and values. The results are processed by a peak detector 104 and a first comparator 105. The first comparator 105 generates a first frequency error signal $e_1$ and provides other information that will be described later.

Figure 4:
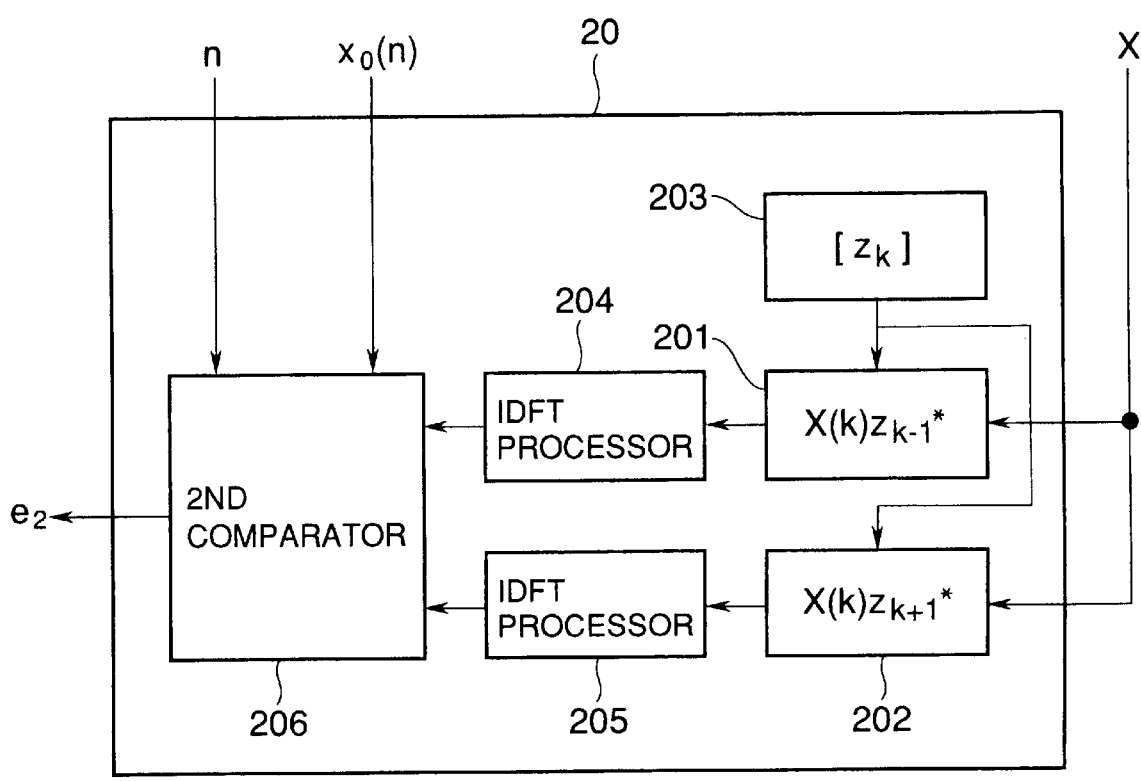
FIG. 4 is a block diagram of the second frequency error detector in the first embodiment.

FIG. 4 shows the internal structure of the second frequency error detector 20. The complex frequency-domain data X are received by a pair of phase modifiers 201 and 202, which also receive known values from an array memory 203. A pair of IDFT processors 204 and 205 perform inverse discrete Fourier transforms on the products of these data and values. The results, and other information received from the first frequency error detector 19, are processed by a second comparator 206, which outputs a second frequency error signal $e_2$.

Next, the operation of the first embodiment will be described, starting with the operation of the first frequency error detector 19.

The phase-reference symbol in the PSK-OFDM signal can be conveniently assigned to an interval from $-t_G$ to $t_S$ on the time axis. The phase-reference symbol has different complex values $z_k$, representing different phase angles, in the K subcarrier signals. Each of these values $z_k$ is of the form $\exp(jq\pi/2)$, where j represents the square root of minus one and q is an integer from zero to three, inclusive. If the signal amplitude is set equal to unity, and the unit of angular frequency is $\omega$, and t is a continuous time variable, the phase-reference symbol can be mathematically described as follows.

$$s(t) = \sum_{k=-K/2}^{K/2} z_k b(t) \exp(jk\omega t)$$

$$b(t) = \begin{cases} 1 & -t_G < t < t_S \\ 0 & \text{otherwise} \end{cases}$$

The values of $z_k$ are the same in every frame. The input to the DFT processor 10 is affected, however, by the frequency error $\zeta$ of the local oscillator 4, by a timing error $\Delta t$ with respect to the start of the phase-reference symbol, and by a frequency-dependent channel gain $h_k$. The phase-reference symbol waveform input to the DFT processor 10 can accordingly be expressed mathematically as follows:

$$x(t) = \sum_{k=-K/2}^{K/2} h_k z_k b(t) \exp[j(k\omega + \zeta)(t - \Delta t)]$$

In the DFT processor 10, the continuous time variable t is replaced by a discrete time variable n which takes on the values of the integers from zero to N−1, where N is a positive integer equal to the number of samples taken per symbol. Using the Greek letter $\xi$ to represent $2\pi\zeta/\omega$ and $\Delta$ to represent the timing error, the equation for the phase-reference symbol waveform can be rewritten as follows:

$$x(n) = \sum_{k=-K/2}^{K/2} h_k z_k b(t) \exp[j(2\pi k + \xi)(n - \Delta)/N]$$

Using $a_k$ to represent $h_k z_k$, the output $X(m)$ of the DFT processor 10 can be expressed as follows, where the variable m denotes the mi-th subcarrier signal, and I(m) is an interference term representing crosstalk from subcarriers other than the m-th subcarrier, due to the frequency error $\xi$:

$$X(m) = \sum_{n=0}^{N-1} \sum_{k=-K/2}^{K/2} a_k b(t) \exp[j(2\pi k + \xi)(n-\Delta)/N - jmn/N]$$

-continued $$= \sum_{n=0}^{N-1} a_k b(t) \exp[j(2\pi m + \xi)(n-\Delta)/N - jmn/N] + I(m)$$

$$= a_m \frac{\sin\frac{\xi}{2}}{\frac{\xi}{2}} \exp\left(j\frac{\xi}{2} - \frac{\pi m \Delta}{N} - \frac{\xi \Delta}{N}\right) + I(m)$$

$$= a'_m \exp[j(\xi/2 - 2\pi m \Delta/N - \xi\Delta/N)] + I(m)$$

The value of I(m) depends on the phase reference data values in the other subcarriers, which do not repeat in any regular cyclic pattern. In this sense the crosstalk is random, and if the number of subcarriers K is sufficiently large, the effect of I(m) will be comparatively small. The phase error component $2\pi m\Delta/N$ depends systematically on m, however, and must be removed if significant results are to be obtained.

Referring again to FIG. 3, the phase modifier 101 in the first frequency error detector 19 multiplies the frequency-domain data array X element-wise by an array of known data comprising the complex conjugates $z_k^*$ of the values $z_k$ encoded in the phase-reference symbol. The multiplications are performed under the assumption of an offset i designated by the first comparator 105; that is, the value X(k) is multiplied by $z_{k-i}^*$ instead of by $z_k^*$. These multiplication operations create a modified frequency-domain data array, which is supplied to the IDFT processor 103 and transformed back to the time domain. The resulting time-domain data, referred to below as a time series, are supplied to the peak detector 104, which finds the peak value in the time series, this being the value with the maximum absolute magnitude.

The above offset i represents a frequency offset equal to i times the subcarrier frequency spacing $F_s$. The first comparator 105 designates different values of i, thus designating frequency offsets equal to different integer multiples of $F_s$. For each designated value of i, the phase modifier 101 creates a different array of modified frequency-domain data, which the JDFT processor 103 converts to a time series. The first comparator 105 designates the zero frequency offset (i=0) and at least two non-zero frequency offsets, preferably including offsets of i=1 and i=−1.

For a given offset i, the inverse discrete Fourier transform performed by the JDFT processor 103 produces a waveform $x_i$ described by the following equation.

$$x_i(n) = \sum_{k=-K/2}^{K/2} a'_k z_{k-i}^* \exp[j(\xi/2 - \xi\Delta/N - 2\pi k\Delta/N + 2\pi kn/N)]$$

$$= \sum_{k=-K/2}^{K/2} a'_k z_{k-i}^* \exp\{j[\xi/2 - \xi\Delta/N - 2\pi k(\Delta - n)/N]\}$$

When the offset i that best compensates for the frequency error of the local oscillator 4 is applied to the $[z_k^*]$ array, the products $a'_k z_{k-i}^*$ will be substantially aligned in the complex plane (will have substantially equal phase angles). When n is also equal to $\Delta$, the phase angles of all terms in the above equation will therefore be substantially aligned, producing a sum with a large absolute magnitude and hence a large peak in the time-series data. For other values of n, the phase angles will differ depending on k, making the terms tend to cancel out, reducing the absolute magnitude of the sum. The time series will therefore have only one large peak value, at n=$\Delta$. If the offset i is not optimal, the phase angles of the products $a'_k z_{k-i}*$ will differ greatly, depending on k, so the terms in the above equation will not be aligned for any value of n, and no large peak value will appear in the time series.

The first comparator 105 accordingly determines the optimal offset i by comparing the peak values $x_i(n)$ detected by the peak detector 104 and selecting the peak value with the largest absolute magnitude, the optimal offset i being the offset that produced this largest peak value. The first frequency error signal $e_1$ instructs the control circuit 21 to adjust the oscillation frequency of the local oscillator 4 by an amount equal to this optimal offset i multiplied by the subcarrier frequency spacing.

If the optimal offset is the zero offset, the first frequency error detector 19 also furnishes the peak value $x_0(n)$ at this offset, and the position n of this peak value in the time series, to the second frequency error detector 20. The position n indicates the timing at which the peak value occurs.

The number of different offsets tested by the first comparator 105 need not be fixed. The first comparator 105 can be adapted to keep trying different offsets until a condition indicating that the largest peak value has been found is satisfied.

Next, the operation of the second frequency error detector 20 will be described. The main function of the second frequency error detector 20 is to detect frequency errors that do not exceed the subcarrier frequency spacing, but are large enough to rotate phase angles by $\pi/2$ or a multiple thereof.

An example of this type of frequency error is shown in FIG. 5. The horizontal axis represents frequency and the vertical axis represents power or gain. The arrows in FIG. 5 represent the the power spectrum of the input to the DFT processor 10, each arrow corresponding to a different subcarrier frequency. The curved line represents the gain of the discrete Fourier transform used to obtain phase data for the m-th subcarrier. The m-th subcarrier frequency should be centered at the peak of the gain curve, at the location indicated by the dashed line in FIG. 5, but is offset from that location by an amount $\Delta f$. As a result, the other subearrier frequencies are displaced from the zero-gain points where the gain curve crosses the horizontal axis.

The m-th output of the DFT processor 10 therefore comprises a strong component obtained from the m-th subcarrier and weaker components obtained from the other subcarriers, as shown in FIG. 6. The frequency error in FIG. 5 can be detected by detecting the weaker components in FIG. 6.

Referring again to FIG. 4, the first phase modifier 201 in the second frequency error detector 20 multiplies the frequency-domain data X for the reference symbol element-wise by the array $[z_{k-1}*]$, the subscript k−1 representing a frequency offset equal to the subcarrier frequency spacing $F_s$. The second phase modifier 202 multiplies the complex frequency-domain data X by the array $[z_{k+1}*]$, the subscript k+1 representing a frequency offset of $-F_s$. The first and second IDFT processors 204 and 205 transform the resulting modified frequency-domain data to a pair of non-zero-offset time series. If the amount of data is sufficiently large, the time series output by the first IDFT processor 204 will represent the signal at the subcarrier frequency marked m−1 in FIG. 6, and the time series output by the second IDFT processor 205 will represent the signal at the subcarrier frequency marked m+1.

The second comparator 206 compares the peak value $x_0(n)$ found by the first frequency error detector 19 with the values $x_1(n)$ and $x_{-1}(n)$ of the time series output by the first and second IDFT processors 204 and 205 at the same timing n. If $x_1(n)$ and $x_0(n)$ have the same sign, $x_{-1}(n)$ has the opposite sign, and both $x_1(n)$ and $x_{-1}(n)$ have absolute magnitudes exceeding a certain threshold value, the second comparator 206 generates a second frequency error signal $e_2$ indicating a frequency error in the positive direction, as shown in FIGS. 5 and 6. If $x_{-1}(n)$ and $x_0(n)$ have the same sign, $x_1(n)$ has the opposite sign, and both $x_1(n)$ and $x_{-1}(n)$ have absolute magnitudes exceeding the threshold value, the second comparator 206 generates a second frequency error signal $e_2$ indicating a frequency error in the negative direction. If the absolute magnitudes of $x_1(n)$ and $x_{-1}(n)$ do not exceed the necessary threshold, the second error signal $e_2$ indicates zero error.

Next, the operation of the control circuit 21 will be described, with reference to the flowchart in FIG. 7. The error signal output by the phase error detector 12 will be referred to as the third frequency error signal $e_3$.

In the first step 301, the control circuit 21 waits for the synchronization detector 8 to detect a null symbol, then starts a frame timer that measures an interval of time substantially equal to the frame length, and synchronizes the operation of the DFT processor 10 with the timing of the null symbol detected by the synchronization detector 8. If the DFT processor 10 is correctly synchronized, the differential demodulator 11 will begin to receive valid phase-shift data and produce valid symbol data.

Since a null symbol has been detected, the control circuit 21 assumes that frame synchronization has been achieved and proceeds to the next three steps 302, 303, and 304. In these steps, the control circuit 21 controls the local oscillator 4 according to the third frequency error signal $e_3$ output by the phase error detector 12. This error signal $e_3$ is obtained by multiplying the output of the differential demodulator 11 by four, dividing by $2\pi$, and comparing the remainder with $\pi$, as in a conventional receiver. The control circuit 21 can make use of the error $e_3$ obtained from every data symbol, excluding the two reference symbols at the beginning of each frame. By averaging a suitable number of values of $e_3$ and adjusting the control signal E sent to the local oscillator 4 at suitable intervals of time, the control circuit 21 can control the local oscillator 4 without incurring a large processing load.

After adjusting the oscillator control signal E (step 302), the control circuit 21 compares the absolute value of the average third frequency error over the next interval ($|\bar{e}_3|$) with a first threshold $T_1$ (step 303). If $|\bar{e}_3|$ exceeds this threshold $T_1$, the control circuit 21 returns to step 302 and adjusts the oscillator control signal E again. The control circuit 21 also returns to step 302 if $|\bar{e}_3|$ does not exceed $T_1$ but the end of the current frame has not been reached, as indicated by the above-mentioned frame timer (step 304).

If the average third frequency error ($|\bar{e}_3|$) has been brought within the first threshold $T_1$ by the end of the current frame, the control circuit 21 proceeds to the next two steps 305 and 306. In step 305, the control circuit 21 checks the output of the synchronization detector 8 at what should be the beginning of the next frame, as determined by the frame timer. In step 306, the control circuit 21 decides whether the output of the synchronization detector 8 indicates a null symbol. If a null symbol is not indicated, the control circuit 21 decides that frame synchronization has failed and returns to step 301 to re-synchronize. If a null symbol is indicated, the control circuit 21 proceeds to the next three steps 307, 308, and 309.

In these three steps the control circuit 21 checks the error signal $e_1$ output by the first frequency error detector 19 (step 307), and decides whether a non-zero frequency error is indicated (step 308). The first frequency error signal $e_1$ indicates frequency errors in multiples of the subcarrier frequency spacing $F_s$, so if a non-zero frequency error is indicated, the control circuit 21 adjusts the frequency of the local oscillator 4 by the appropriate multiple of $F_s$ (step 309), then returns to step 302 to repeat the process of controlling the local oscillator 4 according to the third frequency error signal $e_3$.

When the first frequency error signal $e_1$ indicates zero error, the control circuit 21 skips step 309 and proceeds from step 308 to the last three steps 310, 311, and 312, Normally, this occurs when the frequency error has been reduced to an amount not exceeding about one-half the subcarrier frequency spacing $F_s$.

The control circuit 21 now checks the error signal $e_2$ output by the second frequency error detector 20 (step 310), and compares the absolute value of $e_2$ with a second threshold $T_2$ (step 311). This second threshold $T_2$ may be zero. An absolute second frequency error $|e_2|$ exceeding $T_2$ indicates that, by controlling the local oscillator 4 according to the third frequency error $e_3$, the control circuit 21 has tuned the local oscillator 4 to a frequency that causes a differential phase error equal to a non-zero multiple of $\pi/2$, which the phase error detector 12 cannot detect. The control circuit 21 alters the oscillator control signal E so as to correct this error (step 312), then returns to step 302. If the absolute second frequency error $|e_2|$ does not exceed $T_2$, the control circuit 21 returns to step 302 without changing the oscillator control signal E.

The frequency corrections applied in steps 309 and 312 are not accurate enough to bring the local oscillator 4 to exactly the right oscillation frequency, but they reduce the frequency error sufficiently for the residual error to be corrected unambiguously in step 302 on the basis of the differential phase error detected by the phase error detector 12. After this state is achieved, the control circuit 21 continues to loop through steps 302, 303, and 304, thereby carrying out an automatic frequency control function that keeps the local oscillator 4 correctly tuned. Once per frame, the control circuit 21 also loops through steps 305 to 312, thereby checking frame synchronization and checking that the local oscillator 4 has not become locked at the wrong frequency.

Figure 7:
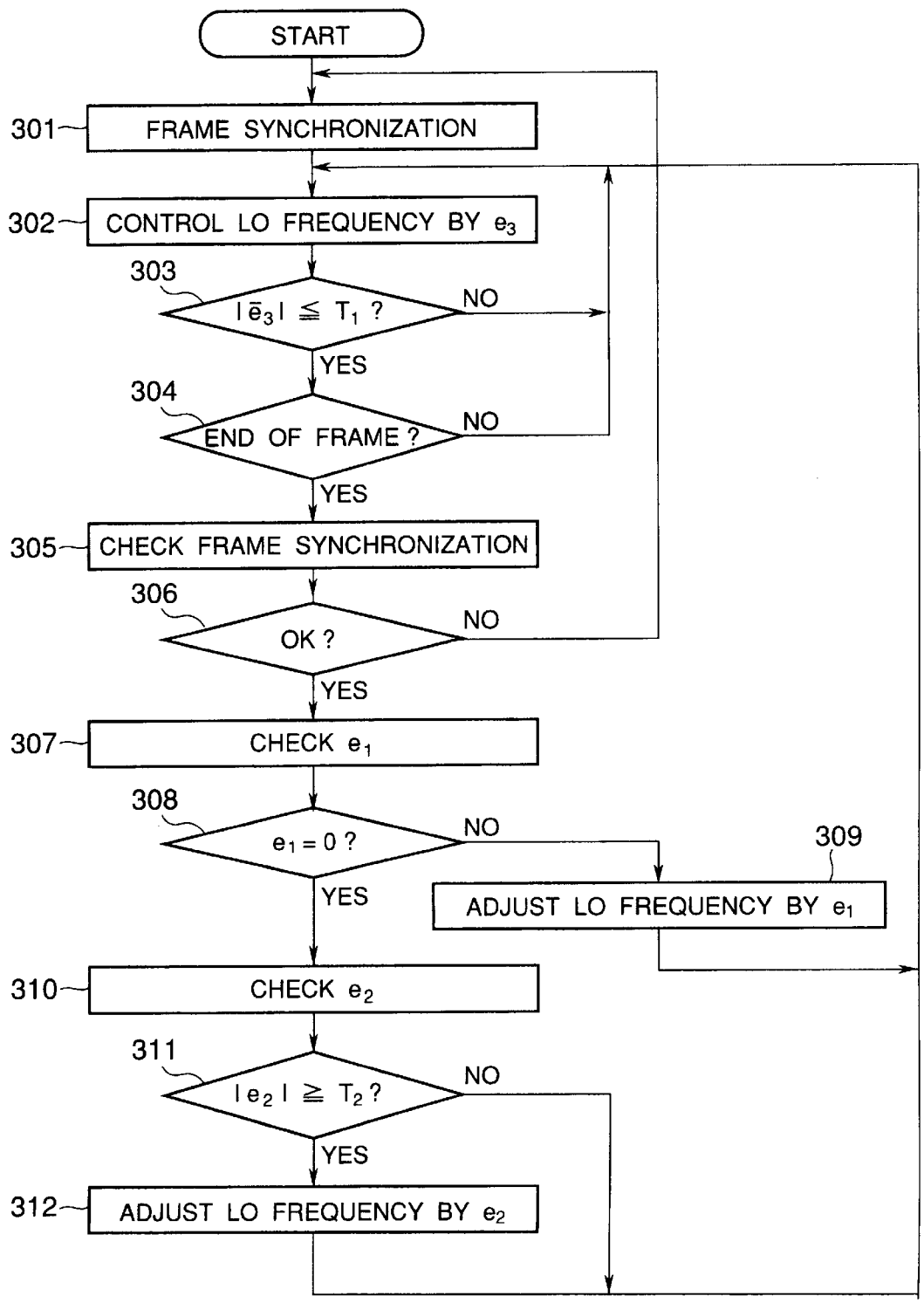
FIG. 7 is a flowchart illustrating the operation of the control circuit in the first embodiment.

The process shown in FIG. 7 is initiated when the digital broadcast receiver is powered up, when the user changes the broadcasting station selection, and at other times when it becomes necessary to acquire correct frame synchronization and frequency tuning. Correct tuning will normally be reached in two stages, each lasting one or more frames. In the first stage, the control circuit 21 controls the local oscillator 4 according to the first and third frequency error signals $e_1$ and $e_3$, in steps 309 and 302. In the second stage, the control circuit 21 controls the local oscillator 4 according to the second and third frequency error signals $e_2$ and $e_3$, in steps 312 and 302. Once achieved, correct tuning is maintained by repeated adjustments in step 302, on the basis of the third frequency error signal $e_3$. In this way, the control circuit 21 can correct both large and small frequency errors.

Next, a second embodiment will be described.

Figure 8:
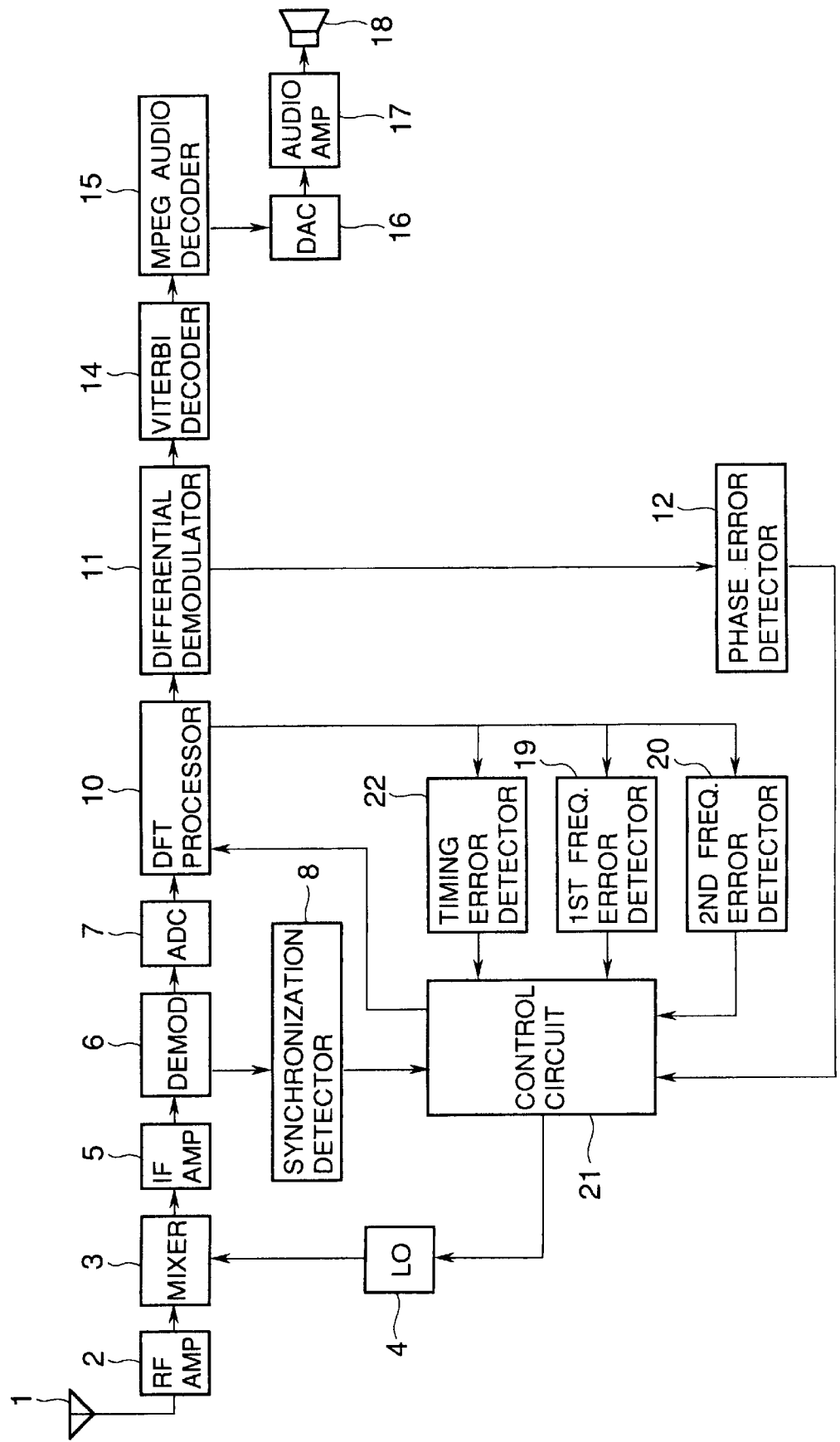
FIG. 8 is a block diagram of a second embodiment of the invention.

Referring to FIG. 8, the second embodiment has all of the elements 1 to 21 described in the first embodiment, and an additional timing error detector 22, which will be described below. The timing error detector 22 receives the frequency-domain data X output by the DFT processor 10 for the phase reference signal, and provides timing error information to the control circuit 21. The control circuit 21 operates somewhat differently from the control circuit 21 in the first embodiment.

Figure 9:
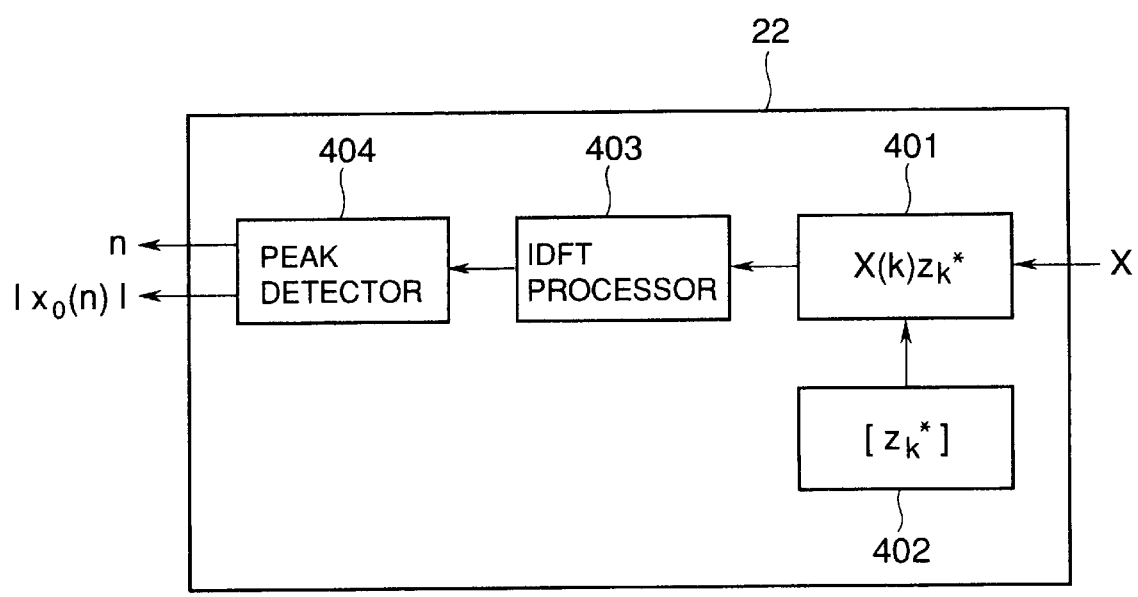
FIG. 9 is a block diagram of the timing error detector in the second embodiment.

FIG. 9 shows the internal structure of the timing error detector 22. The frequency-domain data array X of the phase-reference symbol is received by a phase modifier 401, which also receives an array of known values $[z_k^*]$ from an array memory 402. An IDFT processor 403 performs an inverse discrete Fourier transform on the element-wise products of these arrays to produce a time series, and a peak detector 404 detects the peak value in the time series. These elements 401, 402, 403, and 404 are identical to the corresponding elements 101, 102, 103, and 104 in the first frequency error detector 19. The phase modifier 401 multiplies each value X(k) in the frequency-domain data X by the corresponding value $z_k^*$, with an assumed frequency offset of zero.

As explained in the description of the first frequency error detector 19, if no frequency error is present, the zero-offset time series $x_0(n)$ output by the IDFT processor 403 has a large peak at a value n equal to the timing error $\Delta$. The peak detector 404 outputs both the peak timing value n and the peak magnitude $|x_0(n)|$.

Next, the operation of the control circuit 21 in the second embodiment will be described with reference to the flowchart in FIG. 10.

Figure 10:
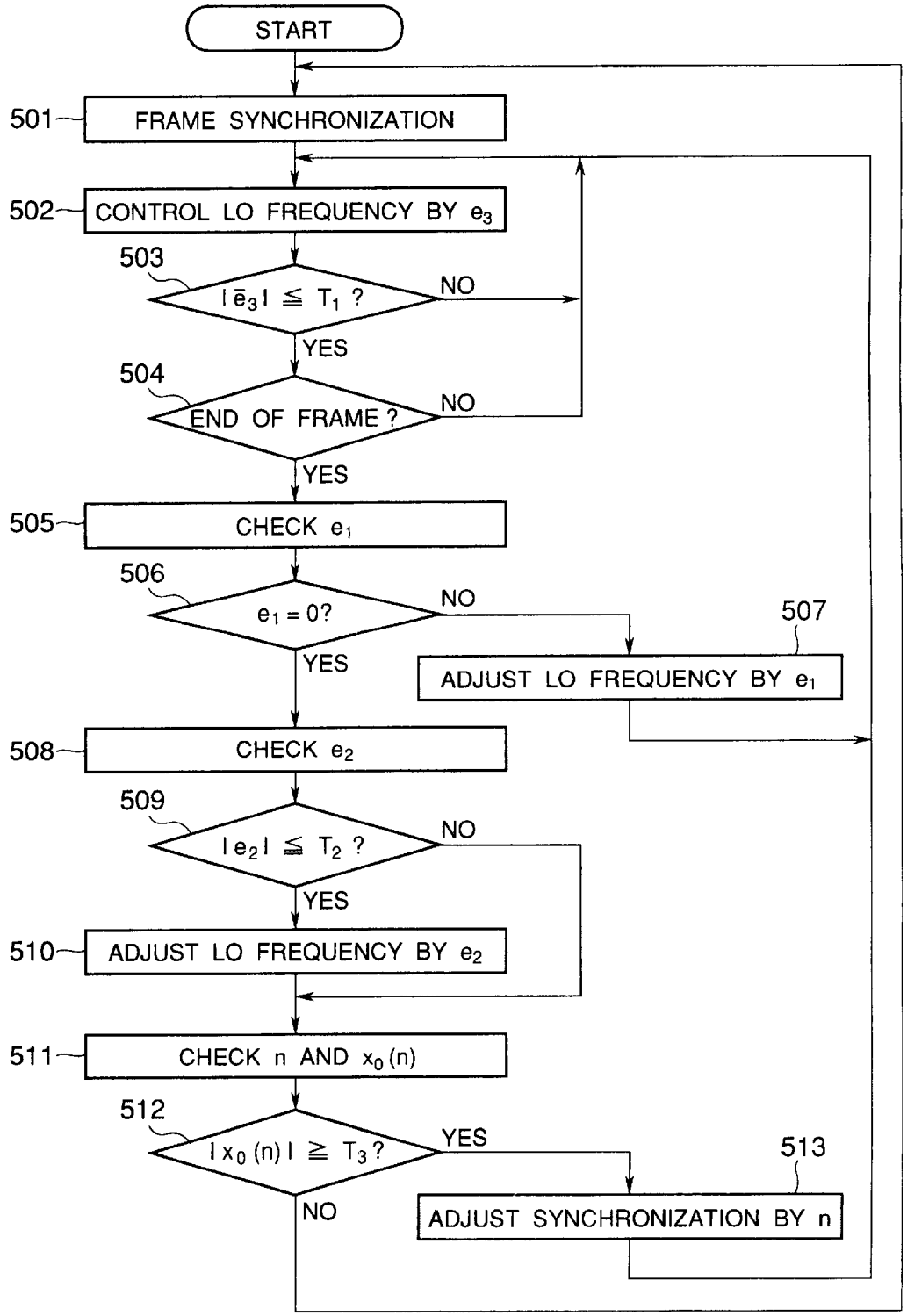
FIG. 10 is a flowchart illustrating the operation of the control circuit in the second embodiment.

Steps 501, 502, 503, and 504 in FIG. 10 are the same as the corresponding steps 301, 302, 303, and 304 in the first embodiment: the control circuit 21 waits for a null symbol to be detected, then sets the frame timer and tunes the local oscillator 4 according to the third frequency error signal $e_3$. When the third frequency error $e_3$ has been reduced to an average value not exceeding the first threshold $T_1$ and the frame timer indicates the end of a frame, the control circuit 21 proceeds in steps 505, 506, and 507 to check the first frequency error signal $e_1$ and correct frequency errors equal to multiples of the subcarrier frequency spacing. These three steps are equivalent to steps 307, 308, and 309 in the first embodiment.

When the first frequency error detector 19 detects a first frequency error $e_1$ equal to zero, the control circuit 21 proceeds in steps 508, 509, and 510 to check the second frequency error signal $e_2$ and adjust the oscillator frequency if necessary. These three steps are equivalent to steps 310, 311, and 312 in the first embodiment.

Following these three steps 508, 509, and 510, in step 511 the control circuit 21 checks the peak value information n and $|x_0(n)|$ output by the timing error detector 22. In step 512, the control circuit 21 compares the peak magnitude $|x_0(n)|$ with a third threshold $T_3$. If $|x_0(n)|$ is less than $T_3$, the control circuit 21 assumes that frame synchronization is incorrect and returns to step 501 to re-synchronize by waiting for the synchronization detector 8 to detect another null symbol. If the peak magnitude $|x_0(n)|$ equals or exceeds the third threshold value $T_3$, in step 513 the control circuit 21 adjusts the synchronization of the DFT processor 10 according to the peak timing n indicated by the timing error detector 22, thereby eliminating the timing error $\Delta$ in the processing of subsequent data symbols; then the control circuit 21 returns to step 502 to continue adjusting the oscillator control signal E according to the third frequency error $e_3$.

During the reception of data symbols, the control circuit 21 loops repeatedly through steps 502, 503, and 504 to keep the local oscillator 4 locked to the correct frequency. Once per frame, when the phase-reference symbol is received, the control circuit 21 also checks the signals output by the first frequency error detector 19, second frequency error detector 20, and timing error detector 22 to verify that the local oscillator 4 is locked at the right frequency, to verify that frame synchronization is correct, and to fine-adjust the frame synchronization according to the timing value n output by the timing error detector 22.

The control circuit 21 in the second embodiment does not perform steps equivalent to steps 305 and 306 in the first embodiment. Once the synchronization detector 8 detects a null symbol in step 501, the control circuit 21 bases further frame synchronization on the frame timer and the output of the timing error detector 22. One advantage of this arrangement is that the adjustments applied once per frame in step 513 enable the second embodiment to achieve more accurate frame synchronization than the first embodiment.

Another advantage is that if the synchronization detector 8 fails to detect a null symbol, because of noise, for example, the control circuit 21 will still be able to verify frame synchronization from the peak value output by the timing error detector 22, and will not be forced to return to step 501 to wait for the next null symbol. The second embodiment is therefore more resistant to noise than the first embodiment, which assumes that synchronization has been lost whenever the synchronization detector 8 fails to detect a null symbol.

Although the phase error detector 12, first frequency error detector 19, second frequency error detector 20, control circuit 21, and timing error detector 22 were shown as separate components in the preceding embodiments, the first frequency error detector 19, second frequency error detector 20, and timing error detector 22 have many common component elements, which can be shared to reduce circuit size and cost. Moreover, the functions of the phase error detector 12, first frequency error detector 19, second frequency error detector 20, control circuit 21, and timing error detector 22 can all be carried out by a suitably programmed computing device such as a digital signal processor.

The second frequency error $e_2$ can be detected by comparing $x_0(n)$ with a value taken from a single non-zero-offset time series, e.g. $x_1(n)$. In this case non-zero frequency error is detected when $x_1(n)$ exceeds a certain threshold, and the direction of the error depends on whether $x_0(n)$ and $x_1(n)$ have the same sign or different signs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of tuning a digital broadcast receiver having a local oscillator and a discrete-Fourier-transform processor, in order to receive a PSK-OFDM signal having a frame-synchronization symbol, a phase-reference symbol, and data symbols, the receiver down-shifting the PSK-OFDM signal by mixing the PSK-OFDM signal with an unmodulated signal output by the local oscillator, thereby obtaining a baseband signal in which a plurality of subcarriers occur with a certain subcarrier frequency spacing, the discrete-Fourier-transform processor obtaining therefrom an array of frequency-domain data, and the phase-reference symbol encoding known data as phase angles of subcarriers of said PSK-OFDM signal, comprising the steps of:

(a) detecting said frame-synchronization symbol;
(b) synchronizing said discrete-Fourier-transform processor to said frame-synchronization symbol;
(c) detecting a first frequency error of said local oscillator by processing the frequency-domain data obtained by said discrete-Fourier-transform processor from said phase-reference symbol, said first frequency error being equal to an integer multiple of said subcarrier frequency spacing;
(d) detecting a second frequency error of said local oscillator by processing the frequency-domain data obtained by said discrete-Fourier-transform processor from said phase-reference symbol, said second frequency error not exceeding said subcarrier frequency spacing;
(e) detecting a third frequency error of said local oscillator by processing phase information in the frequency-domain data obtained by said discrete-Fourier-transform processor from said data symbols;
(f) adjusting said local oscillator responsive to said first frequency error and said third frequency error until said first frequency error is reduced to zero and said third frequency error does not exceed a first threshold;
(g) adjusting said local oscillator responsive to said second frequency error after said step (f), if said second frequency error exceeds a second threshold; and
(h) repeating said steps (f) and (g) until said first frequency error is zero and said second frequency error does not exceed said second threshold, and continuing thereafter to adjust said local oscillator responsive to said third frequency error.

2. The method of claim 1, further comprising the steps of:
multiplying said array of frequency-domain data element-wise by an array of complex conjugates of said known data, assuming a plurality of different frequency offsets between said frequency-domain data and said known data, thereby obtaining a plurality of modified data arrays, said frequency offsets being equal to integer multiples of said subcarrier frequency spacing, one of said frequency offsets being equal to zero; and
transforming said modified data arrays to time-domain data, thereby obtaining a plurality of time series.

3. The method of claim 2, wherein said step (c) further comprises the steps of:
detecting respective peak values in said time series, one peak value of maximum absolute magnitude thus being detected in each of said time series; and
selecting a largest peak value among said peak values.

4. The method of claim 2, wherein said step (d) further comprises the steps of:
detecting a peak value of maximum absolute magnitude in the time series obtained by assuming a frequency offset equal to zero; and
comparing said peak value with a value occurring at an identical time in at least one of said time series obtained by assuming a frequency offset not equal to zero.

5. The method of claim 1, further comprising the steps of:
(i) detecting a timing error of said discrete-Fourier-transform processor by processing the frequency-domain data obtained by said discrete-Fourier-transform processor from said phase-reference symbol; and
(j) synchronizing said discrete-Fourier-transform processor responsive to said timing error, thereby reducing said timing error, after said step (f).

6. The method of claim 5, wherein said step (i) further comprises the steps of:
multiplying said array of frequency-domain data element-wise by an array of complex conjugates of said known data, assuming a frequency offset equal to zero between said frequency-domain data and said known data, thereby obtaining a single modified data array;

transforming said single modified data array to time-domain data, thereby obtaining a single time series; and detecting a time at which a peak value of maximum absolute magnitude occurs in said single time series.

7. The method of claim 6, comprising the further step of:

comparing the magnitude of said peak value in said single time series with a second threshold value; and repeating said steps (a) and (b) if the magnitude of said peak value in said single time series is less than said second threshold value.

8. A digital broadcast receiver for receiving a broadcast signal in which a plurality of subcarrier signals, each modulated by differential phase-shift keying, are multiplexed by orthogonal frequency-division multiplexing with a certain subcarrier frequency spacing, the broadcast signal being divided into frames, each frame beginning with a frame-synchronization symbol, the frame-synchronization symbol being followed by a phase-reference symbol encoding known data, and the phase-reference symbol being followed by data symbols, comprising:

a local oscillator for generating an unmodulated signal having a certain frequency, the unmodulated signal being mixed with said broadcast signal to produce a down-shifted signal;

a synchronization detector coupled to said local oscillator, for detecting said frame-synchronization symbol by envelop detection of said down-shifted signal;

a discrete-Fourier-transform processor for obtaining frequency-domain data from said down-shifted signal, thereby detecting phase data of all of said subcarrier signals simultaneously;

a first frequency error detector coupled to said discrete-Fourier-transform processor, for detecting a first frequency error equal to an integer multiple of said subcarrier frequency spacing, from the frequency-domain data of said phase-reference symbol;

a second frequency error detector coupled to said discrete-Fourier-transform processor, for detecting a second frequency error not exceeding said subcarrier frequency spacing, from the frequency-domain data of said phase-reference symbol;

a differential demodulator coupled to said discrete-Fourier-transform processor, for differentially demodulating said subcarrier signals by taking differences between said phase data in successive symbols to obtain differential phase data;

a phase error detector coupled to said differential demodulator for detecting a third frequency error from said differential phase data; and a control circuit coupled to said local oscillator, for waiting for said synchronization detector to detect said frame-synchronization symbol, then tuning said local oscillator according said third frequency error and said first frequency error, and when said first frequency error has been reduced to zero and said third frequency error has been reduced to a value not exceeding a certain threshold, then tuning said local oscillator according to said second frequency error.

9. The digital broadcast receiver of claim 8, wherein said first frequency error detector comprises:

a first phase modifier;

a first array memory;

a first inverse-discrete-Fourier-transform processor;

a first peak detector; and a first comparator.

10. The digital broadcast receiver of claim 9, wherein said first array memory stores complex conjugates of said known data, said first phase modifier multiplies said frequency-domain data by said complex conjugates under a plurality of different frequency offsets specified by said first comparator, thereby generating modified frequency-domain data, said first inverse-discrete-Fourier-transform processor generates a corresponding plurality of different time series from said modified frequency-domain data, said first peak detector finds peak values of maximum absolute magnitude in respective time series, and said first comparator selects a largest peak value among said peak values.

11. The digital broadcast receiver of claim 10, wherein said second frequency error detector comprises:

a second phase modifier;

a second array memory;

a second inverse-discrete-Fourier-transform processor; and a second comparator.

12. The digital broadcast receiver of claim 11, wherein said second array memory stores complex conjugates of said known data, said second phase modifier multiplies said frequency-domain data by said complex conjugates under a non-zero frequency offset, thereby modifying said frequency-domain data, said second inverse-discrete-Fourier-transform processor converts the frequency-domain data as modified by said second phase modifier to a non-zero-offset time series, and said second comparator compares a value occurring in said non-zero-offset time series at a time indicated by said first frequency error detector with the largest peak value selected by said first comparator.

13. The digital broadcast receiver of claim 8, further comprising a timing error detector coupled to said discrete-Fourier-transform processor, for detecting a timing error of said discrete-Fourier-transform processor from the frequency-domain data of said phase-reference symbol and notifying said control circuit, wherein said control circuit synchronizes said discrete-Fourier-transform processor responsive to said timing error, thereby correcting said timing error.

14. The digital broadcast receiver of claim 13, wherein said timing error detector comprises:

a third phase modifier;

a third array memory;

a third inverse-discrete-Fourier-transform processor; and a second peak detector.

15. The digital broadcast receiver of claim 14, wherein said third array memory stores complex conjugates of said known data, said third phase modifier multiplies said frequency-domain data by said complex conjugates under an assumed frequency offset of zero, thereby modifying said frequency-domain data, said third inverse-discrete-Fourier-transform processor converts the frequency-domain data as modified by said third phase modifier to zero-offset time-series data, and said peak detector detects a time at which a peak value occurs in said zero-offset time-series data.

16. The digital broadcast receiver of claim 15, wherein said control circuit verifies frame synchronization according to the magnitude of the peak value of maximum absolute magnitude occurring in said zero-offset time-series data.

* * * * *